July 5, 1955

W. H. BROWN 2,712,622

MULTIPLE MOTOR CONTROL SYSTEMS

Filed March 30, 1953

INVENTOR:
William H. Brown,
BY
Bair, Freeman & Molinare
ATTORNEYS.

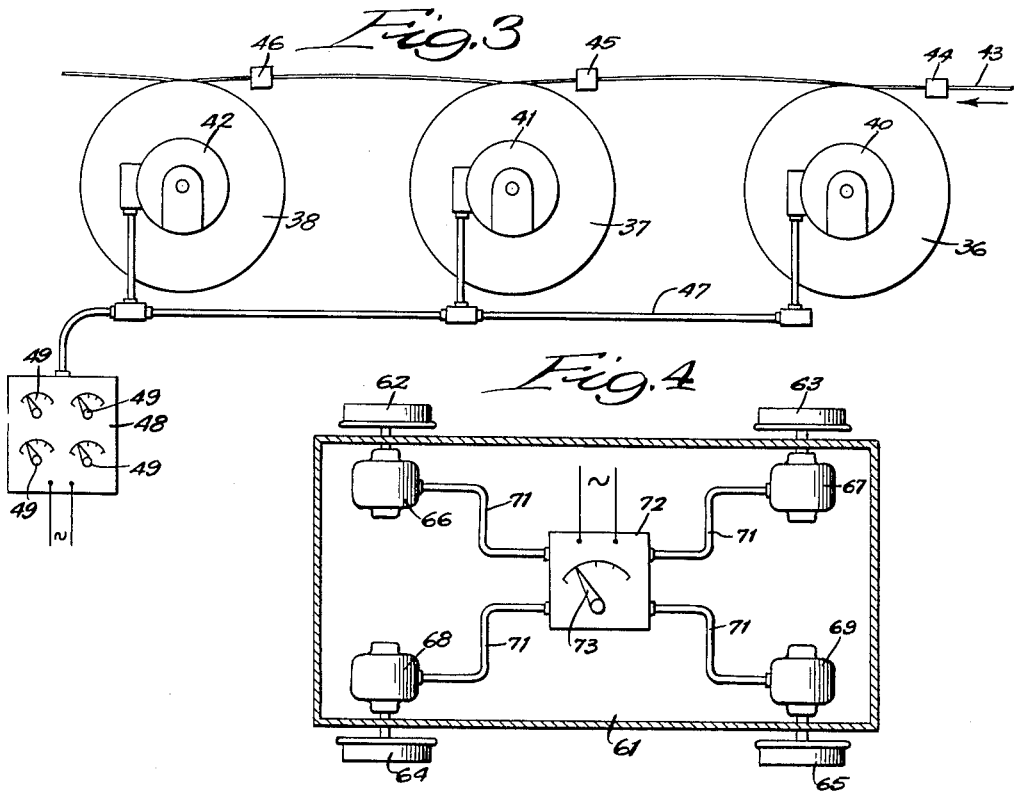
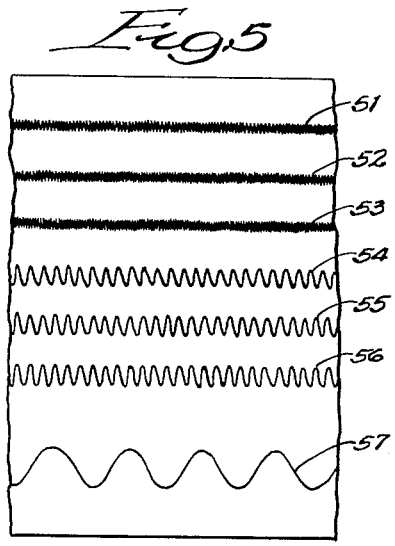
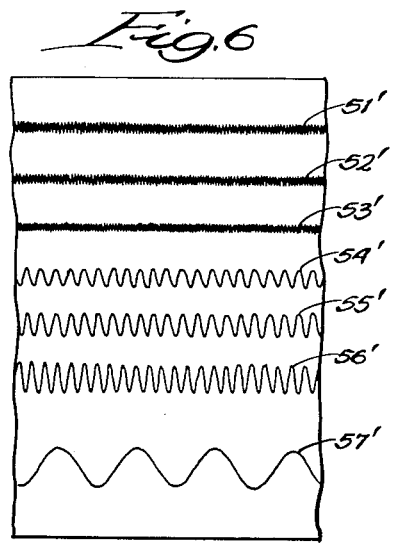

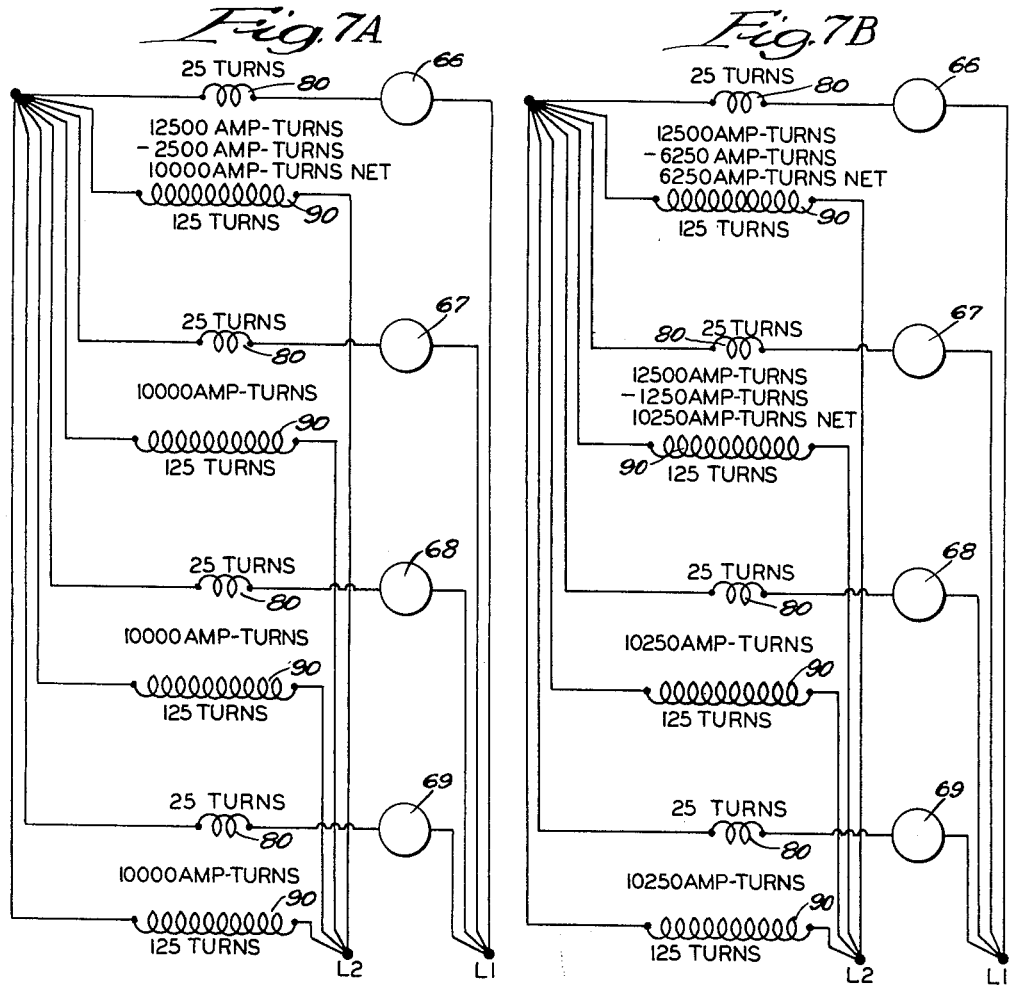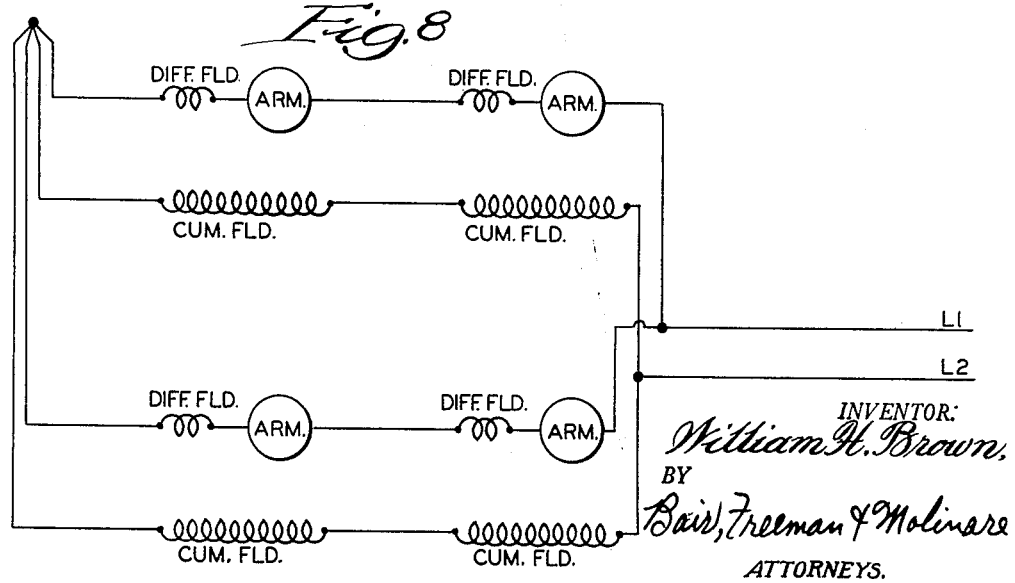

United States Patent Office 2,712,622
Patented July 5, 1955

2,712,622

MULTIPLE MOTOR CONTROL SYSTEMS

William H. Brown, Hanna City, Ill.

Application March 30, 1953, Serial No. 345,463

10 Claims. (Cl. 318—6)

This invention relates to multiple motor control systems and more particularly to systems for controlling the speeds of a plurality of separately loaded and independently rotatable motors.

There are a great many installations in which it is necessary to control the relative speeds of a plurality of motors which are separately loaded and whose loads may or may not be interrelated. One example is the feeding of continuous strips such as paper, fabric or the like over a series of feed rollers. The feed rollers are preferably driven by independent motors for convenience of installation and to accommodate any shrinkage or stretching of the material. While the loads on the motors in installations of this type are theoretically interrelated to the extent that changes in any one motor speed will affect tension of the strip at the adjacent motors, such tension changes are very small, particularly when weak material is being handled, and the problem becomes primarily one of speed regulation.

Another example is a multiple pass wire drawing or strip rolling machine in which the draw blocks or rolls must be driven at different speeds to take care of elongation of the material and must be independently rotatable to accommodate irregularities in the material and wear on the dies or rolls. In such machines the loads on the motors are partially interrelated in that speeding up of an intermediate motor will pick up slack and unload a preceding motor but will have no effect on a succeeding motor. Similarly slowing down of an intermediate motor will increase the load on a succeeding motor but will not affect the preceding motor. In this case also the amount of load interrelation is limited by the strength of the material and the problem is primarily one of speed regulation.

An example of directly interrelated loads occurs in an electric locomotive, crane drive, or the like wherein the several traction wheels or axles are driven by separate motors. Under normal conditions the wheels are driven at the same speeds and the tractive load is divided between them. However, if one wheel should slip the load on the other wheels will be increased and the control system should accommodate the load variations and also should limit and correct the speed of the slipping wheel.

Conversely, if one wheel should slide the load on the other wheels will be decreased and the control system should accommodate the load variations and also should limit and correct the speed of the sliding wheels in a manner and by the means shown on the accompanying sketch.

It is one of the objects of the present invention to provide a motor control system which will maintain the relative speeds of a plurality of electric motors substantially constant regardless of variations in the relative loads.

Another object is to provide a motor control system in which the control is produced automatically in response to changes in the electrical characteristics of the system with no moving parts.

According to one feature of the invention control is produced by providing accumulative and differential fields for the motors which are so arranged as to produce the desired speed control. The motors may be compound wound with shunt fields in addition to the accumulative and differential fields.

The above and other objects and features of the invention will be more readily apparent from the following description when read in connection with the accompanying drawings, in which:

Figure 3 is a diagram illustrating application of the invention to a multiple block wire drawing machine;

Figures 4, 7A, and 7B are diagrams illustrating the application of the invention to electrically driven locomotives; and Figures 5 and 6 are oscillographs showing motor speeds and currents under different operating conditions.

Figure 1:
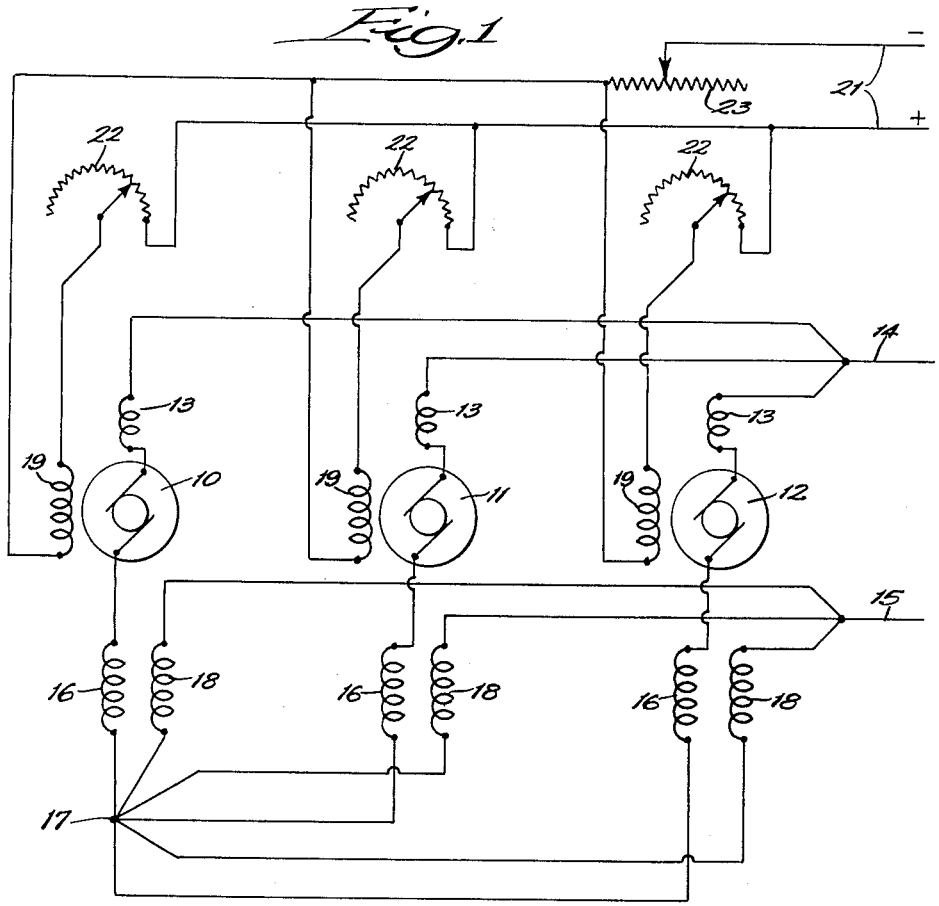
Figure 1 is a circuit diagram of a multiple motor circuit embodying the invention.

As shown in Figure 1 the system is applied to control the relative speeds of three motors which are separately loaded and independently rotatable relative to each other although it will be apparent that any multiple number of motors could be controlled in exactly the same way. The motors have armatures 10, 11 and 12 wound to carry current and are connected in parallel through interpole or commutating fields 13 to one side 14 of a source of direct current. The opposite side of each armature 10, 11 and 12 is connected in series with its respective first field winding 16 and all of the field windings 16 are connected to a common point 17.

Each motor includes a second field winding 18 and the several second fields are connected in parallel between the common point 17 and the side 15 of the source. Each winding 18 is wound adjacent to the field 16 for the same motor and is poled to oppose the field 16. The fields 16 and 18 may have the same number of turns so that they completely cancel each other when they carry the same currents or they may have different numbers of turns to produce series accumulative or differential characteristics if desired.

It will be noted that the total lengths of the leads from the line 14 through each of the motors to the common point 17 are equal so that the ohmic resistance of the several motors is equal. Also the total lead lengths from the common point 17 through the several windings 18 to the line 15 is equal and the several windings 18 are preferably identical so that the total impedances in the several parallel circuits including the windings 18 are the same. These relationships are important to maintain a balanced system regardless of changes in the source voltages.

Each motor additionally has a shunt field 19 which forms its main field. The shunt fields are connected to a power source 21, which may be the same as the source 14, 15 through individual rheostats 22 by which the shunt fields can be individually adjusted to adjust the relative motor speeds. A rheostat 23 is preferably provided in series between the several shunt fields and the source 21 to adjust the several motor speeds simultaneously.

In operation of the system the individual motor speeds can be set as desired by the rheostats 22 to determine the proportionate speeds of the several motors and the overall speed can be set by the rheostat 23. Assuming that the motors are identical, each second field 18 will carry the same current and each armature will carry a current determined by its developed counter-E. M. F. It will be seen that the counter-E. M. F. developed in each motor is dependent upon the motor speed and the total field which in turn is dependent upon the constant effects of the windings 19 and the variable effect of the windings 18 and 16. In the circuit shown in Figure 1 the windings 16 are accumulative and windings 18 are differential with respect to the windings 19.

Upon a change in any one of the motors relative to the others due to a change in relative loads or a change in impedance due to temperature, commutator resistance or the like, the system will function to maintain the relative motor speeds the same. Assuming an increase in load on the motor 10, its armature will tend to slow down and its counter-E. M. F. will tend to decrease. Motor 10 will draw increased armature current which will flow through the winding 16 to increase its overall field strength. The increased current through motor 10 will be divided equally among the differential fields 18 tending to reduce the overall field strengths of all of the motors. This reduces the counter-E. M. F. of motors 11 and 12 so that they will draw greater armature current and greater current through their windings 16 to increase their field strength and reduce their speeds. This increased current will again be divided equally from common point 17 through the differential windings 18 to reduce the overall field strengths of the motors and to increase their speeds.

If we assume an increase in the current through any one of the armatures, 10 for example of nine amperes, this current will be divided equally from junction point 17 and three amperes will flow through each of the differential fields 18. This will partially offset the accumulative effect of the nine amperes through the accumulative field 16 in the motor with armature 10, and will reduce the total field strength in motors with armatures 11 and 12. However the instant that this happens, the counter-E. M. F. in armatures 11 and 12 will be reduced, permitting more current to flow through armatures 11 and 12 and their accumulative fields 16. When these fields have more turns than the differential fields 18, the net result is to increase the overall field strength thus reducing the speeds of the motors 11 and 12. Furthermore this increased current through armatures 11 and 12 is again divided at junction point 17 to further increase the currents through the differential fields 18 to again bring a more close balance in the accumulative and differential fields of the motor with armature 10; and at the same time causing more current to flow through the differential fields 18 of motors with armatures 11 and 12, again reducing the counter-E. M. F. in armatures 11 and 12, and permitting more current to flow thus increasing the accumulative field strength in these motors so as to reduce their speeds as before, until the speeds are again brought into their proper balanced relationships in all three motors. It has been found in actual practice that any variation in the relative speeds of the motors will be corrected very rapidly due to changes in the flow of line current as described and to cross flow of current between the motors so that the motor speeds are kept in the desired relationship within very close limits regardless of the relative loads carried by them.

One application of the circuit of Figure 1 to a multiple block wire drawing machine is illustrated in Figure 3. As shown the machine comprises three rotatable draw blocks 36, 37 and 38 driven respectively by motors 40, 41 and 42 which may correspond to the motors 10, 11 and 12 of Figure 1. A wire 43 is threaded through dies 44, 45 and 46 and may have a plurality of turns around each block. Preferably the wire is drawn without back tension; i. e., the wire is slack between block 36 and die 45 and between block 37 and die 46. The motors are connected as shown in Figure 1 through wiring conduits 47 which may lead from a control box 48 containing the rheostats 22 and 23 and having knobs 49 for adjusting them.

In the operation of such a machine the loads imposed on the motors may be different and may vary independently due to irregularities in the wire, die wear and the like. Assuming that the load on the center motor 41 is increased due to a hard spot in the wire, the center motor will tend to slow down. The preceding motor 40 will not be affected but unless the speed of the succeeding motor 42 is corrected it will take up the slack in the wire and will have its load increased also with serious danger of wire breakage. Unless the speed of motor 40 is corrected it may create an excessive amount of slack such as to lose frictional engagement between block 36 and the wire or possibly to tangle the wire.

An actual oscillograph taken from a machine like that of Figure 3 is shown in Figure 5. The lines 51, 52 and 53 represent the respective motor currents, the lines 54, 55 and 56 represent the respective motor speeds and the line 57 is a 60 cycle current line for time comparison. From an examination of this oscillograph it will be apparent that only relatively small variations in the relative load occurred since the current and speed changes are relatively small. The actual speed changes were not accurately determined but are believed to be on the order of 1 or 2 R. P. M. in 300 to 500 or less than 1%.

The speed change lines show that speed changes occurred in relatively uniform cycles at the rate of about 360 cycles per second. A careful study of the oscillograph shows that the motor speeds follow each other very closely with first one motor and then another leading. This is apparently due to small hard or soft spots in the wire striking the different dies in succession and may be due in part to a hunting or cycling effect in the system.

The current lines indicate that the motor currents change at a much higher rate than the speeds. This is believed to be due to the fact that the currents in all of the motors change each time there is any change in the relative speeds of the motors and to interflow of currents between the several motors.

Figure 6 illustrates the current and speed condition in the same system when only one motor is loaded, lines in Figure 6 corresponding to similar lines in Figure 5 being indicated by the same reference numerals primed. In this operation wire was passed only through the first die and was drawn through the die by the motor whose speed is indicated by the line 54', the motors whose speeds are indicated by the lines 55' and 56' running idly. It will be seen that the motor speed and current characteristics are the same as when all of the motors are loaded except that the speed fluctuations of the idling motors are greater than the fluctuations of the loaded motor. This is to be expected since the load has a damping effect on speed changes. The motor speeds are, however, maintained the same within close limits just as when all of the motors are loaded as shown in Figure 5.

Figure 2:
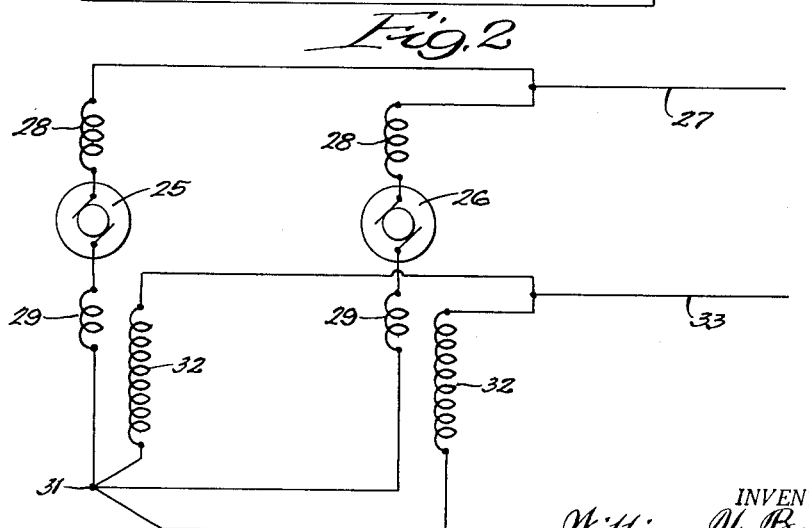
Figure 2 is a diagram of an alternative circuit.

The circuit of Figure 2 is more particularly adapted for use with loads of the type normally driven by series motors such as locomotive drives, crane drives and the like. Two motors having wound armatures 25 and 26 are shown although any desired number of motors could be used with the same effect. The armatures are connected in parallel with one side of a power source indicated at 27 through commutating or interpole fields 28 and through series differential fields 29 to a common point 31. Accumulative fields 32 having a larger number of turns than the fields 29 are connected in parallel between the common point 31 and the other side 33 of the power source. Preferably the number of turns in the fields 32 exceeds the normal number of turns in a comparable series motor by the number of turns in the fields 29.

With identical motors running under the same load and speed conditions the currents in the differential and accumulative fields will be equal and the net fields will be produced by the turns in fields 32 in excess of the turns in fields 29. If the load on motor 25 is decreased it will tend to speed up and its armature current will decrease. This will decrease the current through its differential field 29 and will decrease equally the current through the accumulative fields 32 of both motors. The current decrease through the field 32 of motor 25 is less than the decrease through its field 29 so that the net result is an increase in field strength to reduce the motor speed. At the same time the current through the field 32 of motor 26 would be decreased tending to increase its speed. In this way the motor speeds are kept substantially the same regardless of variations in their loads.

Figure 4 illustrates an application of the circuit of Figure 2 to an electric locomotive. As shown the locomotive includes a frame 61 supported on four driving wheels 62, 63, 64 and 65 which are driven respectively by separate motors 66, 67, 68 and 69. The motors are connected in a circuit such as shown in Figure 2 through conduits 71 leading from a control panel 72 which may contain a rheostat controlled by a handle 73 to vary the locomotive speed.

When all of the wheels have good traction they will all turn at the same speed on the rails and the tractive load will be divided equally. If desired, of course, the wheels could be of different sizes and be driven by different sized motors to carry different proportions of the tractive load. If one wheel should strike an oily or slick spot and start to spin its motor would be substantially unloaded and the other motors would have to carry the entire tractive load so that their loads would be correspondingly increased. Under these conditions the field strength of the slipping motor would be increased to hold its speed down to substantially the speed of the other motors as described above. At the same time the field strength of the other motors would decrease so that they tend to speed up and carry the load. As soon as the slipping wheel regained traction it would again assume its proportion of the load. Thus any spinning of a slipping wheel is avoided and the load is divided among the wheels and motors in condition to carry it.

Figures 7a and 7b show schematically what would happen in the circuit if one of the wheels on the above locomotive would tend to slide. Let 66, 67, 68 and 69 represent the motor armatures. Let 80 represent the differential fields, and let 90 represent the accumulative fields.

If the locomotive is operating with good traction on all four wheels, Figure 7a will represent normal operation. Assuming that one hundred amperes flows through each armature, the effective field strength of each motor is ten thousand ampere-turns as shown.

Assume that the wheel driven by the motor whose armature is 66 tends to begin to slide. Figure 7b shows what would then take place. The current through armature 66 would increase to a much larger figure because if the wheel were tending to slide, the armature would not be rotating as fast as the armature 67, 68 and 69 and hence would not develop as much counter-E. M. F. Let us assume that two hundred and fifty amperes would then flow through armature 66. This current would also flow through the differential field 80 of this motor, but upon reaching point 17 would divide equally through the accumulative fields 90. Therefore the effective field strength of the motor whose armature is 66, would be decreased to six thousand two hundred and fifty ampere-turns. Therefore the speed of this motor would tend to increase. The effective field strength of the motors whose armatures are 67, 68 and 69 would be increased to ten thousand two hundred and fifty ampere-turns which would tend to slow these motors down. Such operation would continue until the four motors were again balanced in their speed relationships.

It should also be understood that with a series-parallel arrangement such as is commonly used in locomotive drive circuits, shown schematically in Figure 8, the same theory of operation of automatic speed regulation and correction would apply as is discussed in conjunction with Figures 2, 7a, and 7b, depending upon whether a locomotive wheel tended to slip or to slide.

This application is a continuation in part of my copending application Serial No. 211,317 filed February 16, 1951.

While several embodiments of the invention have been shown and described in detail it will be understood that these are illustrative only and are not to be taken as a definition of the scope of the invention, reference being had for this purpose to the appended claims.

What is claimed is:

1. A multiple motor control system for controlling the relative speeds of a plurality of separately loaded motors which are capable of rotation independently of each other comprising a plurality of separately loaded and independently rotatable motors each having an armature, a first field for each motor connected in series with the armature and the armatures and first fields of the motors being connected in parallel with each other between one side of a source of power and a common point, a second field for each motor wound to oppose the first field, the second fields being connected in parallel between said common point and the other side of the source of power whereby any change in the speed of one of the motors relative to the others will cause a change in the current through the armature and first field of said one of the motors and corresponding changes in the currents through the second fields of all of the motors and through the armatures and first fields of the other motors to maintain the relative speeds of all of the motors substantially the same.

2. A multiple motor control system for controlling the relative speeds of a plurality of separately loaded motors which are capable of rotation independently of each other comprising a plurality of separately loaded and independently rotatable motors each having an armature, a first field for each motor connected in series with the armature and the armatures and first fields of the motors being connected in parallel with each other between one side of a source of power and a common point, a second field for each motor wound to oppose the first field, the second fields being connected in parallel between said common point and the other side of the source of power whereby any change in the speed of one of the motors relative to the others will cause a change in the current through the armature and first field of said one of the motors and corresponding changes in the currents through the second fields of all of the motors and through the armatures and first fields of the other motors to maintain the relative speeds of all of the motors substantially the same, the first fields and armatures of the several motors defining paths of known or possibly equal ohmic resistance between said one side of the source and the common point and the second fields defining paths of equal impedance between the common point and the other side of the source.

3. A multiple motor control system for controlling the relative speeds of a plurality of separately loaded motors which are capable of rotation independently of each other comprising a plurality of separately loaded and independently rotatable motors each having an armature, a first field for each motor connected in series with the armature and the armatures and first fields of the motors being connected in parallel with each other between one side of a source of power and a common point, a second field for each motor wound to oppose the first field, the second fields being connected in parallel between said common point and the other side of the source of power whereby any change in the speed of one of the motors relative to the others will cause a change in the current through the armature and first field of said one of the motors and corresponding changes in the currents through the second fields of all of the motors and through the armatures and first fields of the other motors to maintain the speeds of the motors relatively the same, said second fields having a greater number of turns than the first fields whereby the second fields function as accumulative fields and the first fields as differential fields.

4. A multiple motor control system for controlling the relative speeds of a plurality of separately loaded motors which are capable of rotation independently of each other comprising a plurality of separately loaded and independently rotatable motors each having an armature, a first field for each motor connected in series with the armature and the armatures and first fields of the motors being connected in parallel with each other between one side of a source of power and a common point, a second field for each motor wound to oppose the first field, the second fields being connected in parallel between said common point and the other side of the source of power whereby any change in the speed of one of the motors relative to the others will cause a change in the current through the armature and first field of said one of the motors and corresponding changes in the currents through the second fields of all of the motors and through the armatures and first fields of the other motors to maintain the speeds of the motors relatively the same and loads connected to said motors which are so interrelated that a change in the load on one of the motors produces an opposite change in the load on at least one of the other motors.

5. A multiple motor control system for controlling the relative speeds of a plurality of separately loaded motors which are capable of rotation independently of each other comprising a plurality of separately loaded and independently rotatable motors each having an armature, a first field for each motor connected in series with the armature and the armatures and first fields of the motors being connected in parallel with each other between one side of a source of power and a common point, a second field for each motor wound to oppose the first field, the second fields being connected in parallel between said common point and the other side of the source of power and a shunt field for each of the motors, the shunt fields being substantially unaffected by changes in the relative speeds of the motors while the currents through all of the second fields are changed proportionately and the relative currents through the armatures and first fields are changed.

6. The construction of claim 5 in which the first fields are accumulative and the second fields are differential with respect to the shunt fields.

7. The construction of claim 5 including individual control devices for the shunt fields and a common control device for all of the shunt fields to vary their effectiveness simultaneously.

8. A multiple motor control system for controlling the relative speeds of a plurality of separately loaded motors which are capable of rotation independently of each other comprising a plurality of separately loaded and independently rotatable motors each having an armature, a first field for each motor connected in series with the armature and the armatures and first fields of the motors being connected in parallel with each other between one side of a source of power and a common point, a second field for each motor wound to oppose the first field, the second fields being connected in parallel between said common point and the other side of the source of power, said second fields having a greater number of turns than the first fields whereby the second fields function as accumulative fields and the first fields as differential fields.

9. A multiple motor control system for a continuous strip handling apparatus including a plurality of independently operable feed units acting successively on the strip to advance it comprising a plurality of motors connected to the feed units respectively to drive them, each motor including an armature, a first field connected in series with the first field, and a second field wound to oppose the first field, the armatures and first fields of the several motors being connected in parallel between one side of a source of power and a common point, the second fields being connected in parallel between said common point and the other side of the source of power whereby any change in the speed of one of the motors relative to the others will cause a change in the current through the armature and first field of said one of the motors and corresponding changes in the currents through the second fields of all of the motors and through the armatures and first fields of the other motors to maintain the relative speeds of all of the motors substantially the same.

10. A multiple motor control system for a continuous strip handling apparatus including a plurality of independently operable feed units acting successively on the strip to advance it comprising a plurality of motors connected to the feed units respectively to drive them, each motor including an armature, a first field connected in series with the first field, and a second field wound to oppose the first field, the armatures and first fields of the several motors being connected in parallel between one side of a source of power and a common point, the second fields being connected in parallel between said common point and the other side of the source of power and a shunt field for each of the motors connected across the source of power, the shunt fields being substantially unaffected by changes in the relative speeds of the motors while the currents through all of the second fields are changed proportionately and the currents through the armatures and first fields are changed relatively to maintain the motor speeds substantially the same.

References Cited in the file of this patent

UNITED STATES PATENTS

| | | |
|---|---|---|
| Re. 19,326 | Powell | Sept. 25, 1934 |
| 416,746 | Rice, Jr. | Dec. 10, 1889 |
| 422,975 | Rice, Jr. | Mar. 11, 1890 |
| 1,134,659 | Wright | Apr. 6, 1915 |
| 1,717,852 | Pollock | June 18, 1929 |

FOREIGN PATENTS

| | | |
|---|---|---|
| 277,745 | Great Britain | Sept. 22, 1927 |